US009930375B2

(12) United States Patent
Garland et al.

(10) Patent No.: US 9,930,375 B2
(45) Date of Patent: Mar. 27, 2018

(54) MEDIA ASSET MANAGEMENT

(71) Applicant: Nexidia Inc., Atlanta, GA (US)

(72) Inventors: Jacob Benjamin Garland, Norcross, GA (US); Drew Lanham, Menlo Park, CA (US)

(73) Assignee: NEXIDIA INC., Atlanta, GA (US)

( * ) Notice: Subject to any disclaimer, the term of this patent is extended or adjusted under 35 U.S.C. 154(b) by 326 days.

(21) Appl. No.: 14/740,794

(22) Filed: Jun. 16, 2015

(65) Prior Publication Data

US 2015/0363420 A1    Dec. 17, 2015

Related U.S. Application Data

(60) Provisional application No. 62/012,476, filed on Jun. 16, 2014.

(51) Int. Cl.
*G06F 17/30* (2006.01)
*H04N 21/234* (2011.01)
*H04N 21/8352* (2011.01)
*H04N 21/84* (2011.01)
*H04N 21/845* (2011.01)
*H04N 21/854* (2011.01)

(52) U.S. Cl.
CPC ... *H04N 21/23418* (2013.01); *H04N 21/8352* (2013.01); *H04N 21/84* (2013.01); *H04N 21/8456* (2013.01); *H04N 21/854* (2013.01)

(58) Field of Classification Search
USPC .................................................. 707/692, 802
See application file for complete search history.

(56) References Cited

U.S. PATENT DOCUMENTS

| | | | | |
|---|---|---|---|---|
| 6,799,158 B2 * | 9/2004 | Fischer | ................... | G10L 17/26 704/205 |
| 7,454,418 B1 * | 11/2008 | Wang | ..................... | G06F 21/564 |
| 7,461,002 B2 * | 12/2008 | Crockett | .................... | 704/200.1 |
| 7,827,147 B1 * | 11/2010 | D'Hoye | .............. | G06F 11/1464 707/652 |
| 8,150,096 B2 * | 4/2012 | Alattar | .................. | G06T 1/0064 380/200 |
| 8,396,897 B2 * | 3/2013 | Rohall | ................. | G06Q 10/107 707/791 |
| 8,660,997 B2 * | 2/2014 | Factor | ............... | G06F 17/30159 707/692 |
| 8,947,595 B1 * | 2/2015 | Tucker | ................. | H04N 21/231 348/445 |
| 8,997,046 B1 * | 3/2015 | McFarlane | ................ | G06F 8/75 707/695 |
| 9,529,840 B1 * | 12/2016 | Granstrom | ........ | G06F 17/30784 |

(Continued)

*Primary Examiner* — Cam-Linh Nguyen
(74) *Attorney, Agent, or Firm* — Pearl Cohen Zedek Latzer Baratz LLP

(57) ABSTRACT

A method includes processing a number of media assets stored in one or more media asset repositories to determine a number of signatures for media in time intervals of the media assets of the number of media assets, processing the number signatures to identify duplicate instances of the signatures in the number of signatures, processing the identified duplicate instances to identify relationships between the identified duplicate instances, and storing the number of signatures and the relationships between the identified duplicate instances of the signatures in a signature data store.

18 Claims, 2 Drawing Sheets

(56) References Cited

U.S. PATENT DOCUMENTS

| | | | |
|---|---|---|---|
| 2001/0023436 A1* | 9/2001 | Srinivasan | G11B 27/031 709/219 |
| 2006/0112120 A1* | 5/2006 | Rohall | G06Q 10/107 |
| 2006/0271947 A1* | 11/2006 | Lienhart | G06F 17/30787 725/19 |
| 2007/0260971 A1* | 11/2007 | Rivas | G06F 17/2229 |
| 2008/0140849 A1* | 6/2008 | Collazo | H04L 29/06027 709/229 |
| 2009/0052784 A1* | 2/2009 | Covell | G06F 17/30784 382/209 |
| 2009/0074235 A1* | 3/2009 | Lahr | G06F 17/30799 382/100 |
| 2009/0154806 A1* | 6/2009 | Chang | G06F 17/30781 382/173 |
| 2009/0263014 A1* | 10/2009 | Zhang | G06F 17/30781 382/165 |
| 2009/0304082 A1* | 12/2009 | Radhakrishnan | G06F 17/30787 375/240.15 |
| 2010/0011392 A1* | 1/2010 | Bronstein | G06K 9/00758 725/28 |
| 2010/0061587 A1* | 3/2010 | Gupta | G06K 9/00744 382/100 |
| 2010/0094817 A1* | 4/2010 | Ben-Shaul | G06F 3/0608 707/697 |
| 2011/0063317 A1* | 3/2011 | Gharaat | G06Q 30/0244 345/545 |
| 2011/0122255 A1* | 5/2011 | Haritaoglu | G06K 9/00711 348/180 |
| 2011/0191320 A1* | 8/2011 | Glover | G06F 17/30 707/706 |
| 2011/0261257 A1* | 10/2011 | Terry | G06K 9/00221 348/515 |
| 2011/0289098 A1* | 11/2011 | Oztaskent | G06F 17/30026 707/769 |
| 2012/0010736 A1 | 1/2012 | Cardillo et al. | |
| 2013/0138654 A1* | 5/2013 | Sathish | G06F 17/30023 707/738 |
| 2013/0163957 A1* | 6/2013 | Ikizyan | G06K 9/00751 386/241 |
| 2013/0188923 A1* | 7/2013 | Hartley | H04N 9/87 386/241 |
| 2013/0339298 A1* | 12/2013 | Muller | G06F 17/30283 707/640 |
| 2014/0114455 A1* | 4/2014 | Larsen | H04H 60/375 700/94 |
| 2014/0201171 A1* | 7/2014 | Vijayan | G06F 17/30156 707/692 |
| 2015/0234848 A1* | 8/2015 | Weinstein | H04L 9/3239 707/698 |
| 2015/0234885 A1* | 8/2015 | Weinstein | G06F 17/30109 707/690 |
| 2015/0237298 A1 | 8/2015 | Garland et al. | |

* cited by examiner

MEDIA ASSET MANAGEMENT

CROSS-REFERENCE TO RELATED APPLICATIONS

This invention claims benefit of U.S. Provisional Application No. 62/012,476 filed Jun. 16, 2014, titled MEDIA ASSET MANAGEMENT, the contents of which are hereby incorporated by reference in their entirety.

BACKGROUND

This invention relates to media asset management and harmonization of metadata in a media development setting.

Organizations such as television networks and motion picture studios often develop and/or distribute multimedia assets such as combined audio and video programming. Some examples of multimedia assets include pre-recorded original programming (e.g., a television series or a motion picture) and live programming (e.g., a sporting event). It is often the case that the organization stores copies of multimedia assets and associates metadata with the multimedia assets. Some examples of metadata that can be associated with multimedia assets include closed captions, subtitles, editor comments, timeline annotations, scene/shot/take notes, character descriptions, and so on.

It is often the case that various developers (e.g., video editors) at the organization use portions (sometimes referred to as 'clips') of stored multimedia assets to generate new multimedia assets. Very generally, a clip is defined as a segment of time in a multimedia asset that may include one or more of audio media, video media, metadata, and so on. For example, a portion of a multimedia asset related to a sporting event (e.g., a highlight) may be used to create a promotional multimedia asset for a broadcast of an upcoming sporting event. In another example, an editor at a motion picture studio may have multiple recorded instances of a single event (e.g., multiple camera angles) and may pick and choose different sections of the multiple recorded instances to generate a scene for the motion picture.

SUMMARY

In a general aspect, a method includes processing a number of media assets stored in one or more media asset repositories to determine a number of signatures for media in time intervals of the media assets of the number of media assets, processing the number of signatures to identify duplicate instances of the signatures in the number of signatures, processing the identified duplicate instances to identify relationships between the identified duplicate instances, and storing the number of signatures and the relationships between the identified duplicate instances of the signatures in a signature data store.

Aspects may include one or more of the following features.

The method may include receiving an edited media asset, processing the edited media asset to determine one or more edit signatures for media in time intervals of the edited media asset, processing the number of signatures in the signature data store to identify duplicate instances of the one or more edit signatures in the number of signatures, and updating the number of signatures and the representation of relationships in the signature data store based on the identified duplicate instances of the edit signatures.

The method may include receiving a query media asset, processing the query media asset to determine a query signature for media of the query media asset, querying the signature data store to identify one or more instances of the query signature in the number of signatures in the signature data store, retrieving metadata associated with the time intervals of the media assets associated with at least some of the one or more instances of the query signature, and forming a query result for the query media asset including forming a representation of the metadata retrieved for the at least some of the one or more instances of the signature.

Forming the representation of the metadata may include forming a union of the metadata retrieved for the at least some of the one or more instances of the signature. Forming the query result may include forming a representation of the relationships between the one or more instances of the signature. The one or more media asset repositories may include at least two separate media asset repositories. Querying the signature data store may include comparing the signature of the query media asset to the signatures stored in the signature data store. The number of signatures for the media may include a number of audio based signatures. The method of claim 1 wherein the number of signatures for the media may include a number of video based signatures.

In another general aspect, a method includes receiving a number of source media assets, receiving an edited media asset, the edited media asset including at least some time intervals having media derived from the number of source media assets, processing the edited media asset to determine one or more edit signatures for media in time intervals of the edited media asset, processing the number of source media assets to determine one or more source signatures for media in time intervals of the media assets of the number of media assets, and forming relationships between media time intervals of the edited media asset and media in the number of source media assets based on a comparison of the one or more edit signatures to the one or more source signatures.

In another general aspect, a computing system includes one or more processing elements for processing a number of media assets stored in one or more media asset repositories to determine a number of signatures for media in time intervals of the media assets of the number of media assets, processing the number signatures to identify duplicate instances of the signatures in the number of signatures, and processing the identified duplicate instances to identify relationships between the identified duplicate instances. The computing system also includes a storage element for storing the number of signatures and the relationships between the identified duplicate instances of the signatures in a signature data store.

Aspects may include one or more of the following features.

The computing system may include an input for receiving an edited media asset. The one or more processing elements may be further configured for processing the edited media asset to determine one or more edit signatures for media in time intervals of the edited media asset, processing the number of signatures in the signature data store to identify duplicate instances of the one or more edit signatures in the number of signatures, and updating the number of signatures and the representation of relationships in the signature data store based on the identified duplicate instances of the edit signatures.

The computing system may include an input for receiving a query media asset. The one or more processing elements may be further configured for processing the query media asset to determine a query signature for media of the query media asset, querying the signature data store to identify one or more instances of the query signature in the number of signatures in the signature data store, retrieving metadata associated with the time intervals of the media assets associated with at least some of the one or more instances of the query signature, and forming a query result for the query media asset including forming a representation of the metadata retrieved for the at least some of the one or more instances of the signature.

Forming the representation of the metadata may include forming, using the one or more processing elements, a union of the metadata retrieved for the at least some of the one or more instances of the signature. Forming the query result may further include forming, using the one or more processing elements, a representation of the relationships between the one or more instances of the signature. The one or more media asset repositories may include at least two separate media asset repositories. Querying the signature data store may include comparing, using the one or more processing elements, the signature of the query media asset to the signatures stored in the signature data store. The number of signatures for the media may include a number of audio based signatures. The number of signatures for the media may include a number of video based signatures.

In another general aspect, a computing system includes an input for receiving a number of source media assets, an input for receiving an edited media asset, the edited media asset including at least some time intervals having media derived from the number of source media assets. The computing system also includes one or more processing elements for processing the edited media asset to determine one or more edit signatures for media in time intervals of the edited media asset, processing the number of source media assets to determine one or more source signatures for media in time intervals of the media assets of the number of media assets, and forming relationships between media time intervals of the edited media asset and media in the number of source media assets based on a comparison of the one or more edit signatures to the one or more source signatures.

In another general aspect, software stored in a non-transitory form on a computer-readable medium includes instructions for causing a computing system to process a number of media assets stored in one or more media asset repositories to determine a number of signatures for media in time intervals of the media assets of the number of media assets, process the number signatures to identify duplicate instances of the signatures in the number of signatures, process the identified duplicate instances to identify relationships between the identified duplicate instances, and store the number of signatures and the relationships between the identified duplicate instances of the signatures in a signature data store.

In another general aspect, software stored in a non-transitory form on a computer-readable medium includes instructions for causing a computing system to receive a number of source media assets, receive an edited media asset, the edited media asset including at least some time intervals having media derived from the number of source media assets, process the edited media asset to determine one or more edit signatures for media in time intervals of the edited media asset, process the number of source media assets to determine one or more source signatures for media in time intervals of the media assets of the number of media assets, and form relationships between media time intervals of the edited media asset and media in the number of source media assets based on a comparison of the one or more edit signatures to the one or more source signatures.

In a general aspect, a signature based duplicate spotting technique is used to augment features provided by a media asset management system. In some aspects, the duplicate spotting technique can be used to identify a number of instances of a media clip across disparate media repositories. The metadata associated with the identified instances is then unified at a centralized location to allow for retrieval of a complete picture of the metadata for the media clip in a single step.

In other aspects, the duplicate spotting technique can be used to provide an enhanced searching ability to a media asset management system. By searching for signatures of a media clip, instances of the media clip can be discovered in media assets managed by the media asset management system, even if the instances are not represented in media clip relationships maintained by a media asset database of the media asset management system.

In other aspects, the duplicate spotting technique can be used to discover relationships between media clips in an edited media asset and media clips in a number of source media assets from which the edited media asset was created.

Other features and advantages of the invention are apparent from the following description, and from the claims.

DESCRIPTION

1 Media Asset Development Workflow

Figure 1:
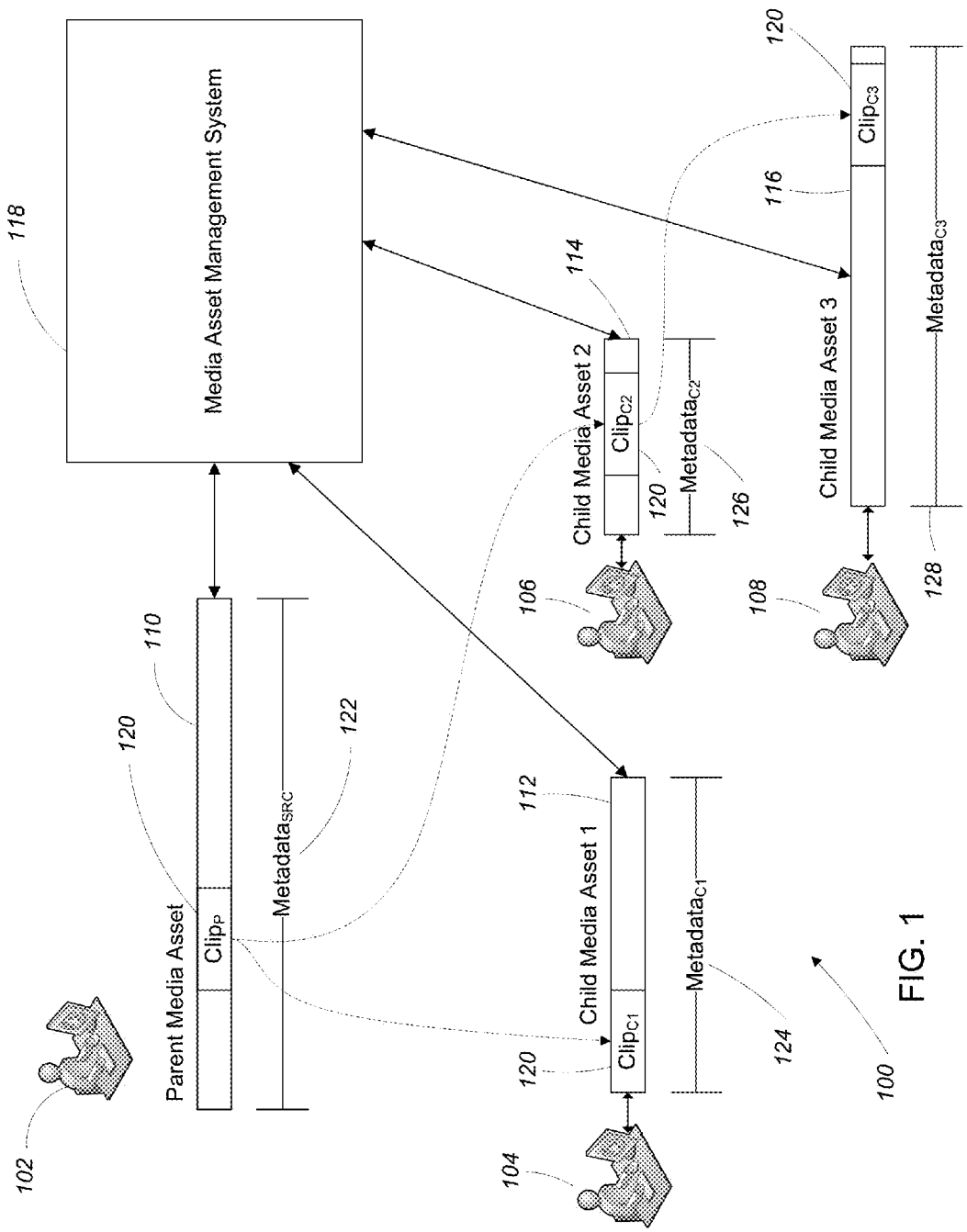
FIG. 1 is a media asset development workflow.

Referring to FIG. 1, an exemplary media development workflow 100 includes a number of media editors 102, 104, 106, 108 developing different media assets 110, 112, 114, 116 while utilizing a media asset management system 118. In some examples, each of the media assets 110, 112, 114, 116 includes audio data and video data and is associated with metadata.

In some examples, a first media editor 102 creates a parent media asset 110 that includes a media clip 120. The parent media asset 110 includes metadata 122 that is specified by a combination of one or more of the first media editor 102, automated metadata creation systems, and any other entities that are involved in creation of the parent media asset 110. When the first media editor 102 has completed work on the parent media asset 110, the parent media asset 110 is committed to the media asset management system 118.

After the parent media asset 110 is committed to the media asset management system 118, a second media editor 104 and a third media editor 106 can independently access the parent media asset 110 using the media asset management system 118 for the purpose of retrieving the clip 120 from the parent media asset 110 for use in media assets that the second media editor 104 and the third media editor 106 are developing. In particular, the second media editor 104 can use the media asset management system 118 to retrieve the clip 120 from the parent media asset 110, which the second media editor 104 subsequently includes in a first child media asset 112. The first child media asset includes a first child metadata 124 which is defined by a combination of one or more of the second media editor 104, automated metadata creation systems, and any other entities that are involved in creation of the first child media asset 112. In some examples, the first child metadata associated with a time interval of the clip 120 in the first child media asset 112 is different from the metadata associated with the clip 120 in the parent media asset 110. In other examples, the first child metadata associated with the time interval of the clip 120 in the first child media asset 112 is the same as the metadata associated with the clip 120 in the parent media asset 110. In yet other examples, the first child metadata associated with the time interval of the clip 120 in the first child media asset includes both the metadata associated with the clip 120 in the parent media asset 110 and additional metadata that differs from the metadata associated with the clip 120 in the parent media asset 110.

Similarly, the third media editor 106 can use the media asset management system 118 to retrieve the clip 120 from the parent media asset 110, which the third media editor 106 subsequently includes in a second child media asset 114. The second child media asset 114 includes a second child metadata 126 which is defined by a combination of one or more of the third media editor 106, automated metadata creation systems, and any other entities that are involved in creation of the second child media asset 114. As was the case with the first child metadata 124, the second child metadata associated with a time interval of the clip 120 in the second child media asset 114 may be different from the metadata associated with the clip 120 in the parent media asset 110. In other examples, the second child metadata associated with the time interval of the clip 120 in the second child media asset 114 is the same as the metadata associated with the clip 120 in the parent media asset 110. In yet other examples, the second child metadata associated with the time interval of the clip 120 in the second child media asset 114 includes both the metadata associated with the clip 120 in the parent media asset 110 and additional metadata that differs from the metadata associated with the clip 120 in the parent media asset 110.

When the second media editor 104 and the third media editor 106 have completed their work on the first child media asset 112 and the second child media asset 114, respectively, they commit the first and second child media assets 112, 114 to the media asset management system 118.

At some time after the second child media asset 114 is committed to the media asset management system 118, a fourth media editor 108 accesses the second child media asset 114 using the media asset management system 118 for the purpose of retrieving the clip 120 from the second child media asset 114 for inclusion in a third child media asset 116 that the fourth media editor 108 is creating. The third child media asset 116 includes a third child metadata 128 which is defined by a combination of one or more of the fourth media editor 108, automated metadata creation systems, and any other entities that are involved in creation of the third child media asset 116. In some examples, third child metadata associated with a time interval of the clip 120 in the third child media asset 116 is different from the metadata associated with the clip 120 in the parent media asset 110. In other examples, the third child metadata associated with the time interval of the clip 120 in the third child media asset 116 is the same as the metadata associated with the clip 120 in the parent media asset 110. In yet other examples, the third child metadata associated with the time interval of the clip 120 in the third child media asset 116 includes both the metadata associated with the clip 120 in the parent media asset 110 and additional metadata that differs from the metadata associated with the clip 120 in the parent media asset 110.

When the fourth media editor 108 has completed their work on the third child media asset 116, the third child media asset 116 is committed to the media asset management system 118.

2 Media Asset Management

As is illustrated in FIG. 1, a given clip extracted from one multimedia asset can be used in the creation of a number of other multimedia assets. Furthermore, metadata associated with the extracted clip can be propagated, augmented, deleted, or replaced. Ideally, when a media asset is committed to the media asset management system 118, a record of the relationships between the media asset and other media assets managed by the media asset management system 118 is submitted as well and is used to update a database of relationships between media assets managed by the media asset management system 118 (as is described in greater detail below). For example, when the first child media asset 112 is committed to the media asset management system 118, a record is submitted indicating that the clip 120 from the parent media asset 110 is included in the first child media asset 112 at a given time interval and that the metadata associated with the clip 120 in the first child media asset 112 is the same as the metadata associated with the clip 120 in the parent media asset 110.

By maintaining relationships between clips of multimedia assets at the media asset management system 118, a relationship of a given clip and its metadata throughout the multimedia assets managed by the media asset management system 118 is preserved. Such a lineage has many uses, including but not limited to version control of media assets, tracking of rights protected (e.g., copyrighted) clips, auditing the playout of commercials during broadcast, de-duplication of media, and so on.

Figure 2:
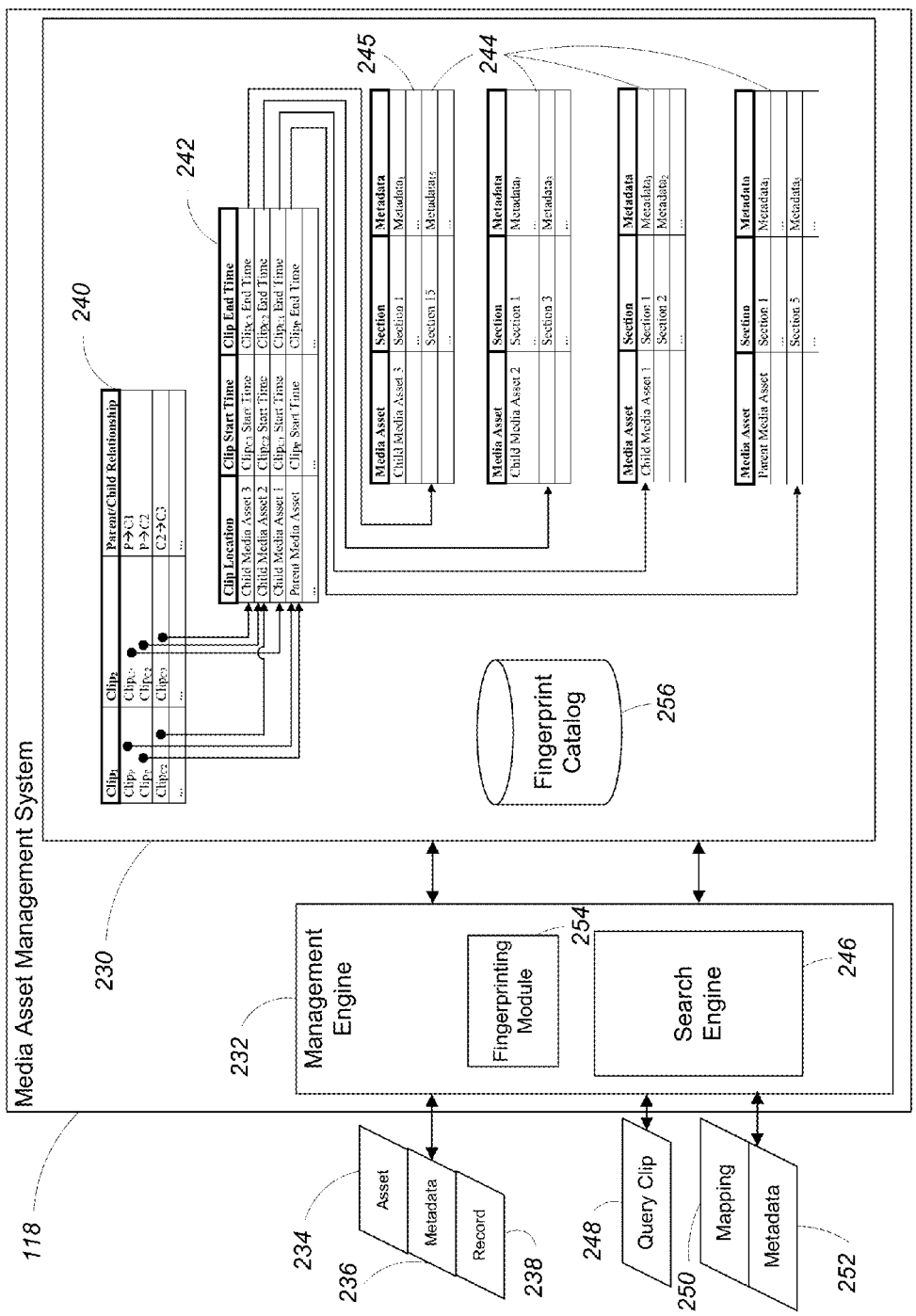
FIG. 2 is a media asset management system.

Referring to FIG. 2, a detailed block diagram of one example of the media asset management system 118 of FIG. 1 includes a media asset database 230 that is managed by a media asset database management engine 232. The management engine 232 includes a fingerprinting module 254 and a search engine 246.

In some examples, when a media asset is committed to the media asset management system 118, the management engine 232 receives the media asset 234, its associated metadata 236, and a record 238 of the relationships between the media asset 234 and the other media assets managed by the media asset management system 118. The management engine 232 updates the media asset database 230 based on the media asset 234, its associated metadata, and the record 238.

In some examples, the media asset database 230 is a relational database including a collection of tables that are organized and related to one another according to a relational model. For example, the media asset database 230 of FIG. 2 includes a clip relationship table 240, a clip location table 242, and a media asset metadata table 244 for each media asset. Each row of the clip relationship table 240 specifies a relationship between two instances of a clip. In some examples, the relationship between two instances of a clip is a parent-child relationship. For example, the first row in the clip relationship table 240 specifies that $Clip_P$ is the parent of $Clip_{C1}$ (as can be seen in FIG. 1.) In other examples, the relationship is a directionless relationship.

The clip location table 242 includes a row for each unique clip in the clip relationship table 240. Each row in the clip location table 242 specifies a media asset in which a clip is located and a start time and an end time of the clip in the media asset. For example, the first row of the clip location table specifies a start time and an end time of a clip in the child media asset 3 of FIG. 1. In FIG. 2, relationships between the individual clips in the clip relationship table 240 and the clip location table 242 are represented by arrows between the individual clips in the clip relationship table 240 and the rows of the clip location table 242. For example, an arrow from $\text{Clip}_{C3}$ in the clip relationship table 240 points to the first row of the clip location table 242, indicating that $\text{Clip}_{C3}$ is located in Child Media Asset 3, beginning at $\text{Clip}_{C3}$ Start Time and ending at $\text{Clip}_{C3}$ End Time.

For each media asset managed by the media asset management system, the media asset database 230 includes a media asset metadata table 244. Each row of a media asset metadata table 244 for a given media asset specifies a section (e.g., a time interval) of the media asset and the metadata associated with the section. In FIG. 2, relationships between the clip locations in the clip location database 242 and the metadata located at sections of the media assets in the media asset metadata tables 244 are represented by arrows between the rows of the clip location database 242 and the media asset metadata tables 244. For example, an arrow from the first row of the clip location database 242 (representing a location of $\text{Clip}_{C3}$ in the third child media asset) to the fifteenth row of a first one of the media asset metadata tables 245 (representing the fifteenth section of the third child media asset) indicates that the time interval in the third child media asset is associated with the metadata associated with the fifteenth section of the third child media asset. As is noted above, some examples of metadata that can be included in the media asset metadata table 244 for a given media asset include closed captions, subtitles, editor comments, timeline annotations, scene/shot/take notes, and character descriptions.

In some examples, the record 238 may be absent, incomplete, or incorrect. For example, if a media editor were to retrieve a media asset from the media asset manager 118, insert a clip into the media asset using an external program that is not managed by the media asset manager 118, then commit the modified media asset to the media asset manager 118, the record 238 would not represent the insertion of the clip. As a result, the insertion of the clip would not be represented in the tables 240, 242, 244 of the media asset database 230.

To prevent such a situation from rendering the media asset database 230 incomplete, when a clip is committed to the media asset manager 118, the fingerprinting module 254 computes a fingerprint for the clip, stores the fingerprint in a fingerprint catalog 256, and then uses a duplicate spotting technique (e.g., the techniques described in U.S. Patent Publication 2012/0010736 A1 titled "SPOTTING MULTIMEDIA" which is incorporated herein by reference) to identify other instances of the clip and the relationships between the identified instances of the clip. The identified instances of the clip and the relationships between the identified instances of the clip can be used by the management engine 232 to update and maintain the tables 240, 242, 244 of the media asset database 230.

2.1 Metadata Harmonization

In some examples, the management engine 232, including the fingerprinting module 254 can be used to harmonize metadata across disparate repositories of media assets that are managed by the media asset manager 118 and include partial or fully duplicated entries. In particular, the fingerprint based duplicate spotting technique described above can be used to identify partially or fully duplicated entries in the disparate repositories (e.g., by searching for duplicates of a fingerprint for a given clip in the fingerprint catalog 256). Once duplicates are identified, time coded metadata (e.g., caption information, time coded tags, etc.) and general metadata (program name, source file, creation date, etc.) associated with the duplicates can be extracted from media asset metadata tables 244 at the time intervals associated with the duplicated entries in their respective media assets.

The extracted metadata gathered from the disparate repositories can then be unified in a single database (e.g., the media asset database 230 or a separate, dedicated harmonized metadata database) to enable a unified search for audio and video assets.

For example, a media editor can query the unified metadata database with a query clip and receive a result including all of the metadata associated with the query clip across the disparate media asset repositories.

3 Searching

In some examples, the search engine 246 receives a query clip 248 from a media editor (e.g., the second media editor 104 of FIG. 1). The search engine queries the tables 240, 242, 244 of the media asset database 230 to identify different instances of the query clip 248 in the media assets managed by the media asset management system 118. Based on the identified instances of the query clip 248, the search engine 246 returns a list of media assets in which the instances of the query clip 248 were identified, the locations of each instance of the query clip 248 in its respective media asset, the metadata associated with each identified instance of the query clip 248, and a representation of the relationships between the instances of the query clip 248 throughout the media assets (e.g., a lineage of the query clip 248).

In some examples, to perform a search, the search engine 246 receives the query clip 248 and searches the clip relationship table 240 to identify all instances of the query clip 248 in the clip relationship table 240. Each instance of the query clip 248 in the clip relationship table 240 is associated with a row in the clip location database 242, the row indicating the media asset in which the instance of the query clip 248 resides and the query clip's start time and end time in the media asset. The relationships between the instances of the query clip 248 determined from the clip relationship table 240, coupled with the relationships between the instances of the query clip 248 and the media assets determined from the clip location database 242 are returned to the media editor as a mapping 250 of the query clip 248 throughout the media assets managed by the media asset manager 118. In some examples, the mapping represents where, in the media assets managed by the media asset manager 118, the query clip 248 has been used. In some examples, the mapping 250 includes historical information which allows for the mapping to be displayed as a lineage of the query clip 248 throughout the media assets.

In some examples, metadata 252 associated with each of the instances of the query clip 248 is retrieved and returned to the media editor. In some examples, the metadata 252 for each instance of the query clip 248 is compiled into a unified metadata representation before it is returned to the media editor. In other examples, the metadata for each instance of the query clip 248 is separately returned to the media editor.

In general, to retrieve the metadata 252, for each instance of the query clip 248, the search engine 246 accesses the media asset metadata table 244 for the media asset in which the instance of the query clip 248 resides. Since the clip location database 242 specifies a time interval for each instance of the query clip 248 in its respective media asset, the metadata for an instance of the query clip 248 can be accessed by retrieving metadata from a row of the media asset metadata table 244 that is associated with the time interval (or "section") of the query clip 248 in the media asset.

3.1 Ad-Hoc Searching

In the searching process described above, the search engine 246 relies on the query clip 248 existing in the clip relationship table 240 and the tables 240, 242, 244 being complete and correct. However, in some examples, for various reasons the tables 240, 242, 244 may be incorrect and/or incomplete, rendering the search results returned by the search engine incorrect and/or incomplete. For example, as is described above, if a media editor were to retrieve a media asset from the media asset manager 118, insert a clip into the media asset using another program that is not managed by the media asset manager 118, and then commit the modified media asset to the media asset manager 118, the insertion of the clip may not be represented in the tables 240, 242, 244 of the media asset database 230. A subsequent table-based search for the inserted clip would incorrectly omit the clip included in the modified media asset from its results.

To avoid such an omission, the search engine 246 included in the management engine 232 can utilize the fingerprinting module 254 to enable an ad-hoc, fingerprint based search for a clip. For example, a media editor can provide a query clip 248 to the search engine 246, which in turn computes a fingerprint for the query clip 248. The duplicate spotting technique described above can then be used to identify all of the instances of the query clip in the media assets managed by the media asset management system 118. As is described above, in some examples, a catalog of clip fingerprints 256 is maintained in the media asset database 230. To identify the instances of the query clip 248, the fingerprints in the catalog of clip fingerprints 256 can be compared to the fingerprint of the query clip 248 to determine matches.

The identified instances of the query clip 248 can then be used to query the media asset metadata tables 244 to compile all of the metadata that is associated with the various instances of the query clip 248. Thus, any clip can be used to query the media asset database 230, even if the clip is not explicitly represented in the clip relationship table 240 and the clip location table 242 of the media asset database 230.

3.2 Reverse Engineered Edit Decision List (EDL)

In some examples, the management engine 232, including the fingerprinting module 254 can be used to generate reverse engineered edit decision list (EDL). For example, given an edited media asset including one or more clips and a number of other source media assets that were used in the creation of the edited media asset, the management engine 232 can determine relationships between the clips in the edited media asset and the source media assets.

In some examples, the management engine 232 analyzes the source media assets to generate a repository of fingerprinted clips. The edited media asset can then be analyzed to determine a number of clip fingerprints present in the edited media asset. The clip fingerprints from the edited media asset can then be matched to fingerprints of clips in the repository of fingerprinted clips (e.g., using the duplicate spotting techniques described above) to determine relationships between the source media assets and clips in the edited media asset. This process of identifying relationships between an edited media asset and source media assets is especially useful when a media asset database is unavailable or unreliable (e.g., corrupt).

4 Alternatives

In general, the approaches described above describe using audio fingerprints to identify instances of media clips. However, it is noted that fingerprints of video fingerprints can also be used in the same fashion. Furthermore, certain advantages can be used by using both video and audio fingerprints together.

In the approaches described above, each instance of a clip has its own metadata which may or may not differ from the metadata of other instances of the clip. However, in some examples, the combined metadata of all of the clips is distributed to all instances of a clip in the media asset database, causing each instance of the clip to have a representation of the metadata of all other instances of the clip.

5 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method comprising:
   processing a plurality of media assets stored in one or more media asset repositories to determine, for each media asset, a plurality of video-based signatures for media in time intervals of the media asset;
   processing the plurality signatures to identify duplicate instances of the signatures in the plurality of signatures;
   processing the identified duplicate instances to identify relationships using the signatures, including parent-child relationships, between the identified duplicate instances; and
   storing the plurality of signatures, the relationships between the media assets corresponding to the identified duplicate instances of the signatures, and information related to metadata at time intervals, in a data store.

2. The method of claim 1 further comprising:
   receiving an edited media asset;
   processing the edited media asset to determine one or more edit signatures for media in time intervals of the edited media asset;

processing the plurality of signatures in the data store to identify duplicate instances of the one or more edit signatures in the plurality of signatures; and updating the plurality of signatures and the representation of relationships in the data store based on the identified duplicate instances of the edit signatures.

3. The method of claim 1 further comprising:

receiving a query media asset;

processing the query media asset to determine a query signature for media of the query media asset;

querying the data store to identify one or more instances of the query signature in the plurality of signatures in the data store;

retrieving metadata associated with the time intervals of the media assets associated with at least some of the one or more instances of the query signature; and forming a query result for the query media asset including forming a representation of the metadata retrieved for the at least some of the one or more instances of the signature.

4. The method of claim 3 wherein forming the representation of the metadata includes forming a union of the metadata retrieved for the at least some of the one or more instances of the signature.

5. The method of claim 3 wherein forming the query result further comprises forming a representation of the relationships between the one or more instances of the signature.

6. The method of claim 3 wherein querying the data store includes comparing the signature of the query media asset to the signatures stored in the data store.

7. The method of claim 1 wherein the one or more media asset repositories includes at least two separate media asset repositories.

8. A method comprising:

receiving a plurality of source media assets, receiving an edited media asset, the edited media asset including at least some time intervals having media derived from the plurality of source media assets;

processing the edited media asset to determine one or more video-based edit signatures for media in time intervals of the edited media asset;

processing the plurality of source media assets to determine, for each media asset, one or more video-based source signatures for media in time intervals of the media asset;

forming relationships, including parent-child relationships, between media time intervals of the edited media asset and media in the plurality of source media assets based on a comparison of the one or more video-based edit signatures to the one or more video-based source signatures and storing the relationships and information related to metadata at time intervals, in a data store.

9. A computing system comprising:

one or more processing elements for processing a plurality of media assets stored in one or more media asset repositories to determine, for each media asset, a plurality of video-based signatures for media in time intervals of the media asset;

processing the plurality of video-based signatures to identify duplicate instances of the video-based signatures in the plurality of video-based signatures;

processing the identified duplicate instances to identify relationships using the signatures, including parent-child relationships, between the identified duplicate instances; and a storage element for storing the plurality of video-based signatures, information related to metadata at time intervals and the relationships between the media assets corresponding to the identified duplicate instances of the video-based signatures in a data store.

10. The system of claim 9 further comprising:

an input for receiving an edited media asset;

wherein the one or more processing elements are further configured for processing the edited media asset to determine one or more edit signatures for media in time intervals of the edited media asset;

processing the plurality of signatures in the data store to identify duplicate instances of the one or more edit signatures in the plurality of signatures; and updating the plurality of signatures and the representation of relationships in the data store based on the identified duplicate instances of the edit signatures.

11. The system of claim 9 further comprising:

an input for receiving a query media asset;

wherein the one or more processing elements are further configured for processing the query media asset to determine a query signature for media of the query media asset;

querying the data store to identify one or more instances of the query signature in the plurality of signatures in the data store;

retrieving metadata associated with the time intervals of the media assets associated with at least some of the one or more instances of the query signature; and forming a query result for the query media asset including forming a representation of the metadata retrieved for the at least some of the one or more instances of the signature.

12. The system of claim 11 wherein forming the representation of the metadata includes forming, using the one or more processing elements, a union of the metadata retrieved for the at least some of the one or more instances of the signature.

13. The system of claim 11 wherein forming the query result further comprises forming, using the one or more processing elements, a representation of the relationships between the one or more instances of the signature.

14. The system of claim 11 wherein querying the data store includes comparing, using the one or more processing elements, the signature of the query media asset to the signatures stored in the data store.

15. The system of claim 9 wherein the one or more media asset repositories includes at least two separate media asset repositories.

16. A computing system comprising:

an input for receiving a plurality of source media assets, an input for receiving an edited media asset, the edited media asset including at least some time intervals having media derived from the plurality of source media assets; and one or more processing elements for processing the edited media asset to determine one or more video-based edit signatures for media in time intervals of the edited media asset;

processing the plurality of source media assets to determine, for each media asset, one or more video-based source signatures for media in time intervals of the media asset;

forming relationships, including parent-child relationships, between media time intervals of the edited media asset and media in the plurality of source media assets based on a comparison of the one or more video-based edit signatures to the one or more video-based source signatures and storing the relationships and information related to metadata at time intervals, in a data store.

17. Software stored in a non-transitory form on a computer-readable medium, the software including instructions for causing a computing system to:

process a plurality of media assets stored in one or more media asset repositories to determine, for each media asset, a plurality of video-based signatures for media in time intervals of the media asset;

process the plurality signatures to identify duplicate instances of the signatures in the plurality of signatures;

process the identified duplicate instances to identify relationships using the signatures, including parent-child relationships, between the identified duplicate instances; and store the plurality of signatures, information related to metadata at time intervals and the relationships between the media assets corresponding to the identified duplicate instances of the signatures in a data store.

18. Software stored in a non-transitory form on a computer-readable medium, the software including instructions for causing a computing system to:

receive a plurality of source media assets, receive an edited media asset, the edited media asset including at least some time intervals having media derived from the plurality of source media assets;

process the edited media asset to determine one or more video-based edit signatures for media in time intervals of the edited media asset;

process the plurality of source media assets to determine, for each media asset, one or more video-based source signatures for media in time intervals of the media asset;

form relationships, including parent-child relationships, between media time intervals of the edited media asset and media in the plurality of source media assets based on a comparison of the one or more video-based edit signatures to the one or more video-based source signatures and store the relationships and information related to metadata at time intervals, in a data store.

* * * * *